United States Patent [19]

Wallace et al.

[11] 4,267,665
[45] May 19, 1981

[54] DOUBLE WALLED THERMAL PROTECTIVE COVERINGS

[76] Inventors: Volney Wallace, Terra, Box 1 West; Carlos F. A. Pinkham, Terra, Box 4 East, both of Dugway, Utah 84022

[21] Appl. No.: 968,745

[22] Filed: Dec. 13, 1978

Related U.S. Application Data

[63] Continuation-in-part of Ser. No. 863,801, Dec. 23, 1977, Pat. No. 4,137,667.

[51] Int. Cl.³ .............................................. A01G 13/00
[52] U.S. Cl. ............................................ 47/26; 47/2; 47/29; 47/28 R
[58] Field of Search ....................................... 47/20-30, 47/2, 41 R; 273/55 D

[56] References Cited

U.S. PATENT DOCUMENTS

| | | | |
|---|---|---|---|
| 2,028,060 | 1/1936 | Gilbert | 47/28.1 |
| 2,232,005 | 2/1941 | Jones | 47/28 |
| 3,206,892 | 9/1965 | Telkes et al. | 47/29 |
| 3,270,461 | 9/1966 | Fowler | 47/2 |
| 3,727,345 | 4/1973 | Smith | 47/2 |
| 4,065,016 | 12/1977 | Perkins | 47/41 R |
| 4,137,667 | 2/1979 | Wallace | 47/26 |

FOREIGN PATENT DOCUMENTS

| | | | |
|---|---|---|---|
| 68643 | 10/1892 | Fed. Rep. of Germany | 47/29 |
| 1508260 | 11/1967 | France | 47/29 |
| 7552 | of 1900 | United Kingdom | 47/28.1 |
| 1144366 | 3/1969 | United Kingdom | 47/2 |

*Primary Examiner*—Robert E. Bagwill

[57] ABSTRACT

Thermal protective coverings for plants are provided by a double walled insulative device closable at the top and adapted to fit about the plant wherein the insulative space within the walls is filled with water or water and air.

17 Claims, 8 Drawing Figures

DOUBLE WALLED THERMAL PROTECTIVE COVERINGS

BACKGROUND OF THE INVENTION

This application is a continuation-in-part of Ser. No. 863,801, filed Dec. 23, 1977 and now U.S. Pat. No. 4,137,667.

This invention relates to a method and means for thermally protecting plants from cold temperature. This invention particularly relates to a method of protecting plants from cold temperatures by utilizing a double walled cover around said objects which is filled with water or water and air.

British Pat. No. 1,144,366 teaches a method for the protective covering of plants by interposing an aqueous layer between the area to be protected and the sky.

While the concept taught in the British Patent sets forth many advantages of utilizing water or water mixtures as thermal protective coverings, there are certain novel improvements which are the subject matter of the present invention.

When water is deployed as a relatively air tight covering over a space to be protected, cold weather cannot freeze anything in that space until it first freezes the protective cover of water. The freezing of this water is slow because water liberates heat on freezing, about 80 calories of heat per gram of ice formed. This release of heat is comparable to the release of heat by an equal weight of rock cooling from about 500 degrees Farenheit down to about 32 degrees Farenheit. In contrast to the hot rock, water releases its heat at 32 degrees Farenheit as if it were a water burning furnace thermostated at 32 degrees. Since heat loss from the system is proportional to the difference between the inside and outside temperature this low temperature release of heat is far more effective than would be a hot rock under a hot cap.

The above-mentioned British Patent is limited to the protection of plants by interposing between the plant and the sky a layer of water in translucent containers. In all cases a multiplicity of containers are used. The primary application of the British Patent is the covering of plants growing in a depression for an extended period of time. The patent purportedly proposes to cover single plants by utilizing a light admitting cover over a plant with water bags leaning on the cover thus covering the plant. However, the bags of water, if they are pliable enough to come together and seal out cold air, flow downhill and form a series of contained puddles alongside the light admitting protective cover.

There is much need for protection of seedlings and young plants against late frosts in the Spring thereby enabling an early start of vegetables and other seedlings. A plant which has a month's head start has an additional month at the end of the season when full development of the plant results in a maximal rate of food production.

U.S. Pat. No. 3,206,892 teaches a protective device for plants containing an inflatable ballast tube partially filled with water adapted to fit around a plant which may also contain a single walled tent or cover extending over the plant. The purpose of the water is to weight the device down and assist in retaining heat in the ground under the ballast. The single walled protective cover offers minimal thermal protection during early spring or late fall or during extreme temperature fluctuations.

U.S. Pat. No. 3,270,461 also teaches a thermal plant protective device having a water ballast tube at the bottom and which is closed at the top forming a single walled cover about most of the plant. Water is sprayed on the plant within the cover and runs down the inside of the cover into the ballast tube. Maximum thermal protection is acquired only by continuously spraying water within the cover.

Another device deploying single walled water ballast tubes is shown in U.S. Pat. No. 3,727,345.

BRIEF DESCRIPTION OF THE INVENTION

It has been discovered that certain structural means for deploying water or water and air in a flexible plastic bag which is double walled and forms a hollow or invaginated opening surrounding the plant is far superior to other prior art devices.

Various types of devices may be used within the scope of the invention. The simplest type of device consists of a plastic bag filled with water or water and air and closed at the top. The bag is placed over a support structure surrounding a plant such that an invaginated opening is formed at the bottom of the bag as it conforms to the contour and shape of the support structure. The plant is protected by the water or air and water surrounding the plant and contained between the wall of the invaginated opening and outside wall of the bag. By "invaginated" is meant an opening formed by enfolding such that that which was formerly an outer surface is folded under to become in inner surface. The opposite may also be true, i.e. An inner surface may be outwardly folded to become an outer surface. Thus, any central opening wherein the inner walls defining such an opening are continuous with outer walls surrounding the inner walls is an "invaginated opening".

A similar invaginated device is formed by a tube turned halfway inside out to form a hollow inner core. The upturned outer walls and unturned inner walls define an annular space which is filled with water or water and air. The ends of the tube are then tied. When the hollow core is placed over a support structure surrounding a plant the plant is protected by the water or air and water in the annular space between the walls of the device.

A still flexible but more self supporting structure consists of a double walled tube wherein the double walls are closed at the bottom but are open at the top. The outside and inside walls are joined together by heat sealing, adhesives, or similar means to form compartments which may be in the form of horizontal, annular rings, vertical tubes, a single spiralling action, or parallel spiralling sections. These compartments may be either separate or communicating. Combinations of rings, tubes, sections and other geometrical configurations are also included as part of this invention. In communicating compartments the walls are not joined together by enclosing lines since that would prevent water or air from flowing into and filling the compartments. Rather, the juncture of the walls defining such compartments is intermittent allowing a fluid to flow from one compartment to another, or the junction is a single line that does not form a closed circuit. Once either type of compartmentalized device has been filled with water or air and water the device becomes substantially self supporting and may be placed over a plant with or without a separate support structure. Such a device, with its self supporting walls, may be opened at the top during periods of warmer weather to allow outside air to circulate around the plant. The open topped device still provides adequate protection against frost damage to a plant providing the temperature does not drop too low. When colder temperatures are expected and more or maximum protection is required, the open top of the device may be partially or completely closed.

Alternatively, separately filled tubes which are annular or elongated may be stacked, spiraled or placed together such as to form a pile of concentric rings or a palisade of tubes and accomplish the same purpose. This arrangement requires additional handling in working with a multiplicity of separate structures. In addition, these structures must be capable of maintaining their shape or they could not cooperate with each other to form an overall thermal protective cover.

Aqueous solutions of plain pure water can provide protection against the cold by the heat released on freezing. It is not the intent of this invention to be limited to any particular aqueous solution. For example, certain specific aqueous solutions maintain certain advantages. A viscous water solution or a gelatinous water solution will function quite well as a freezable barrier for protecting plants and other goods and have the specific advantage that there is little or no convective currents in the water to hasten heat transfer with a cold environment and the aqueous wall can be self supporting. Additives to water that improve its absorption of near infrared radiation, green light and/or ultraviolet light will lessen the excursion of termerature under the water barrier by day without interferring with photosynthesis and will hasten solar melting of any ice formed. Additives that absorb ultraviolet light can prolong the life of a plastic container. If desired, the water can also be shaded, or if it is not to be used over growing plants for extended periods of time, it can even be opaque. The water container can be similarly clear or absorbent of radiation.

When utilizing any closed form of this invention, an essentially air tight space will be formed about the object being protected. As regards plants, the air tight space created around the plant does not interfere with photosynthesis. While an air tight cover over the plants excludes atmospheric $CO_2$, the atmosphere surrounding the plants still contains $CO_2$, there being sufficient $CO_2$ gas diffusing from the soil to support good growth of seedlings under an air tight cover. Even if there were to be circumstances wherein the $CO_2$ supply was seriously limited under such coverage the grower could improve the supply of $CO_2$ by adding fermentable matter to the soil or setting up a fermentation vessel within the protected place. Also ventilation can be provided to the interior space during warm periods by simply opening or removing the protective cover when it is not needed.

DRAWINGS

DETAILED DESCRIPTION OF THE INVENTION

The basic effect of the water barrier in protecting a plant enclosed by the barrier is delay in temperature drop. Maximum thermal protection is provided by deploying a protective device which will completely surround the plant with a water barrier. Where maximum protection is not required it may not be necessary to completely surround the growing space with water. However, a completely closed insulative barrier may prove to be beneficial. In those situations an insulative device having a lower insulative water layer and an upper insulative dead air space layer may be provided by only partially filling the protective device with water. The depth of water in the device will depend upon the degree of thermal protection desired. As temperatures become more mild, such as encountered in late spring or early fall, double walled devices providing coverings of water and air may be sufficient. Moreover, many plants may be adequately protected by providing a device which can be closed at night or on colder days to form an insulative covering of water or water and air and yet, be opened at the top during the day, thereby shielding the plants at the sides but allowing open air to circulate in from the top. An open top may also facilitate watering of the plant.

Devices adapted to meet these needs and providing complete illustrative embodiments of the invention are shown in FIGS. 1–8.

Figure 1:
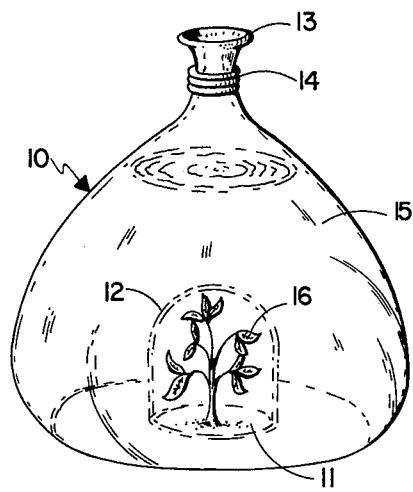
FIG. 1 is a perspective view of an invaginated bag completely encompassing a rigid structure which surrounds a plant thereby forming a dead air space around the plant substantially enclosed by water.

One embodiment of the invention for providing plants is shown in FIG. 1, and comprises a bag 10 having an invaginated opening 11 formed by fitting the bag 10 over a protective cover or framework 12. A plastic bag 10 closed at the top 13 by a tie 14 and containing an aqueous solution 15 is used. The bag is capable of becoming invaginated when placed over a protective cover or framework 12 surrounding a plant 16. The plant is thermally protected by being surrounded by a water barrier 15 on all sides. However, this bag, unless secured at the top may have a tendency to lean.

Figure 2:
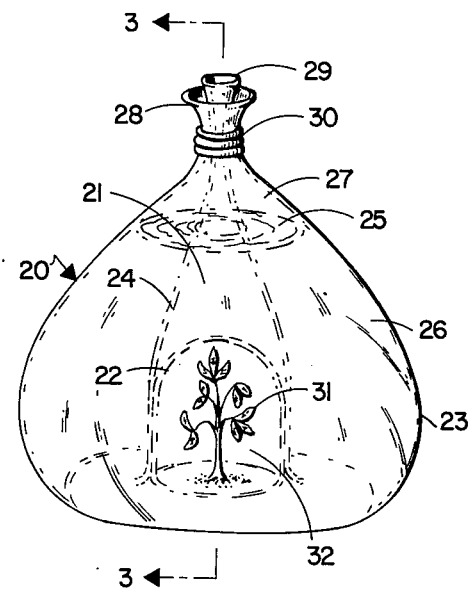
FIG. 2 is a perspective view of a tubular container folded partway back and tied at the ends creating a hollow core and an annular water space completely encompassing a rigid structure which surrounds a plant thereby forming a dead air space around the plant substantially enclosed by water.
Figure 3:
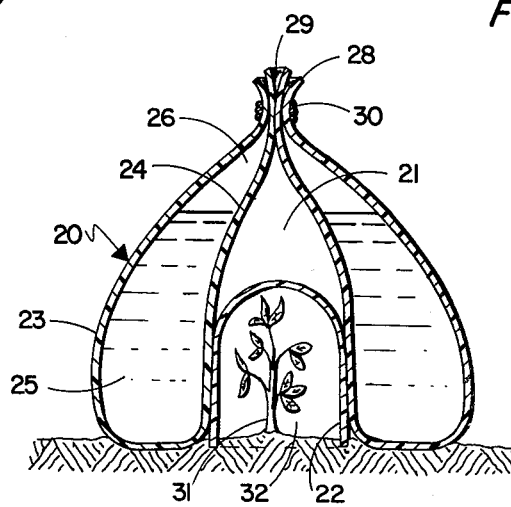
FIG. 3 is a cross-section of FIG. 2 taken along lines 3—3.

A alternative embodiment as more clearly shown in FIGS. 2 and 3 comprises a flexible tube 20 which is more than twice as long as the protective cover 22 is high and is somewhat larger in perimeter than the protective cover. The tube 20 is turned halfway inside out to form as an invaginated opening, a structure having a hollow core 21. The turned outer walls 23 and inner walls 24 define an annular space 25 which is filled with water 26 or water 26 and air 27. The ends 28 and 29 are then securely tied together by a tie 30. The tieing of the inner and outer parts together prevents the unwanted leaning of the water-filled tube when placed over a protective cover 22. A plant 31 thus has a dead air space 32 defined by protective cover 22 and is completely covered by a canopy of water. If desired, tie 30 may be loosely tied allowing a small opening into the hollow core 21 for ventilation or watering the plant contained therein. If desired, the top can be left completely open in good weather for ventilation and watering.

Figure 4:
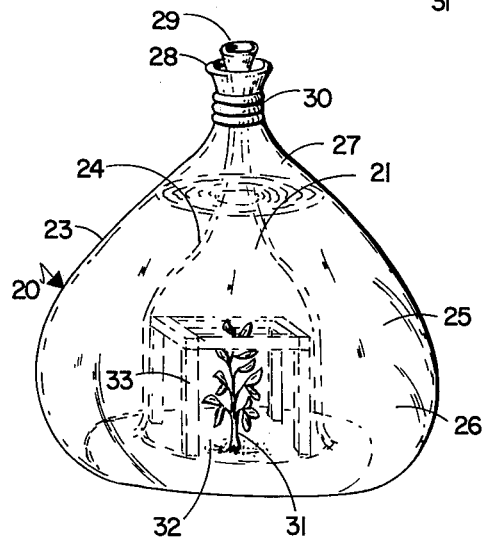
FIG. 4 is a perspective view of another embodiment of the invention showing a frame network over which is placed a tubular structure as shown in FIG. 2 which is partially filled with water.

FIG. 4 is similar to FIG. 2 except a frame support is illustrated. The tube 20 is turned halfway inside out having an outer wall 23 and an inner wall 24. The ends of the tube 28 and 29 are tied together with a tie 30 thereby creating a hollow core or invaginated opening 21. Between walls 23 and 24 is an annular space 25 which may be filled to the desired depth with a water solution before the ends 28 and 29 are tied together. Annular space 25 will then contain an aqueous solution 26 in the lower portions thereof and an insulative dead air space 27 above the solution level. Covering 20 is supported by an open frame work 33 containing three or more vertical supports which are connected at the top by horizontal supports to keep the frame work from collapsing. The covering 20 is placed over the framework 33 such that the space defined by hollow core 21 is the protected area. The amount of water to be added to annular space 25 will depend upon the degree of thermal protection desired. Thus the space within 25 to be occupied by water 26 and dead air 27 may vary. The framework 33 may be completely surrounded by water or partially surrounded by water and partially by dead air.

Additional thermal buffering may be obtained by using containers filled with water as the vertical supports. Large fruit juice cans or plastic milk jugs can be used for this purpose.

Figure 5:
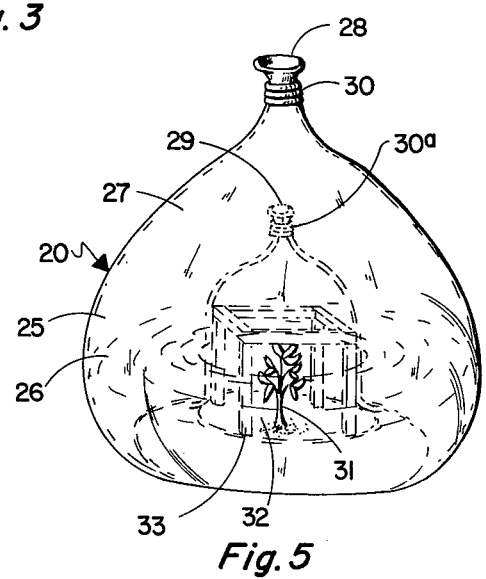
FIG. 5 is a perspective view similar to FIG. 4 wherein the tied ends of the tubular water bag are separated from each other and the plant is partially surrounded by water and partially by air.

A variant of the protective covering shown in FIG. 4 is illustrated by FIG. 5. In this configuration more dead air space 27 is created in annular space 25 by separating ends 28 and 29. End 29 is closed by tie 30a and the desired amount of water is added to annular space 25. End 28 is then closed by a separate tie 30. The remaining portions of the covering and support structure are the same as described for FIG. 4. However, in this embodiment the water 26 is annular space 25 only partially surrounds space 32, containing plant 31, defined by structure 33. The upper portion of space 32 is encompassed by dead air air space 27.

As can be seen from FIGS. 2-5 there are many variations in support structure, water depth and positioning of the tied ends 28 and 29 of tube 20 that can be used, all of which result in enclosing the plant growing space 32 with a double walled protective device wherein the space between the walls is filled with water or water and air.

Figure 6:
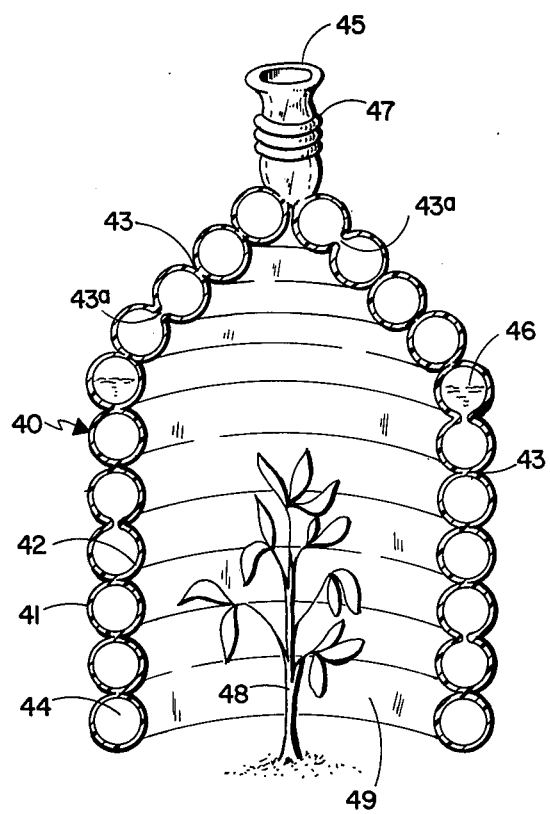
FIG. 6 is a vertical cross-sectional view of another embodiment of the invention consisting of a double walled device sectioned in horizontal annular rings partially filled with water and closed at the top.
Figure 7:
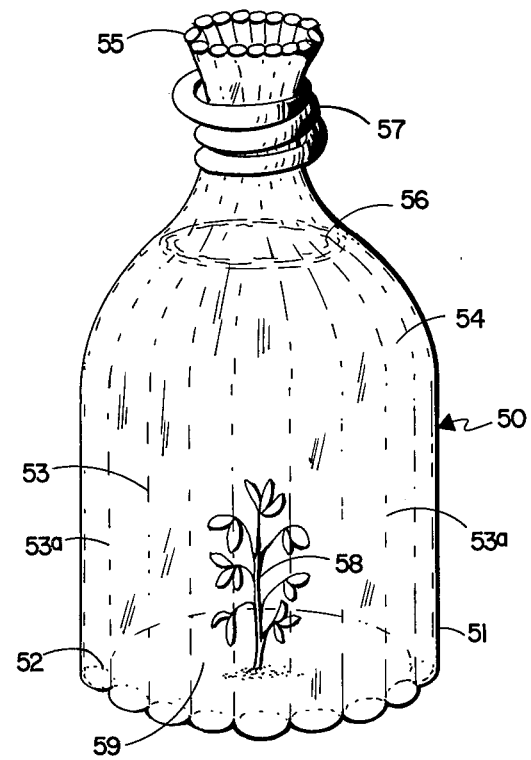
FIG. 7 is a perspective view of a still different embodiment of the invention consisting of a double walled device sectioned in vertical tubes partially filled with water which is partially open at the top.
Figure 8:
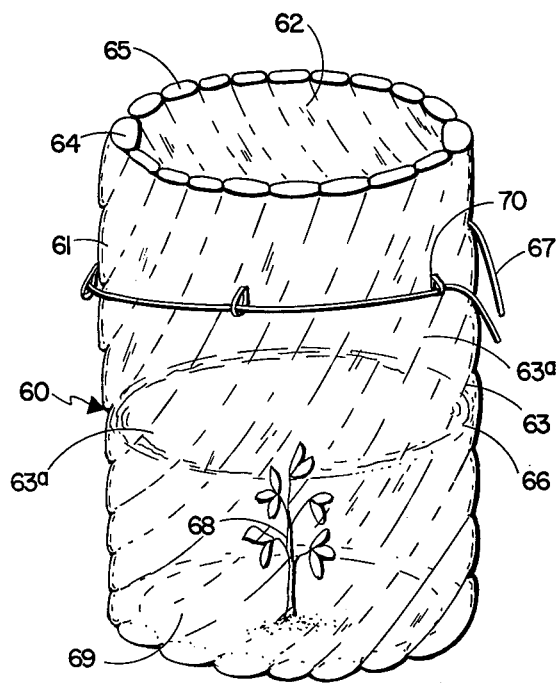
FIG. 8 is a perspective view of yet another embodiment of the invention consisting of a double walled device sectioned in spiralling sections partially filled with water and open at the top.

FIGS. 6, 7 and 8 illustrate variations of a particularly preferred embodiment of the invention. In each of these embodiments a double walled structure is used wherein the walls are joined such as to the form compartments between the walls. The joining of the walls prevents them from spreading under water pressure and therefore forms a semi-rigid self supporting structure. The compartments may be either separate or fluid communicating. The walls are preferably joined by heat sealing but may also be joined by adhesives or other similar means.

A cross sectional view of one variation is shown in FIG. 6. The device 40 is a double walled tube wherein the outer wall 41 and inner wall 42 are closed at the bottom but open at the top 45. The walls are joined together along annular lines 43 to form communicating compartments 44 in the form of horizontal annular rings. Annular lines 43 are parallel to each other but do not form a continuous circumferential line. There are breaks 43a in the sealing lines where the walls are not joined together to allow water or air to flow from one compartment to another. The walls of the device are open at the top 45 and the device is inflated by adding water between the walls at the top until the desired depth, indicated by numeral 46, has been reached. The device 40 is then closed at the top and tied by a tie 47 trapping dead air in compartments 44 within the double walls 41 and 42 above water line 46. The bottom end of the tube is open and, when placed about a plant 48, creates an enclosed insulated space 49. Support structures may be used if needed but the tube 40, weighted down with water within its walls is generally self supporting. The amount of water within the double walls may vary. The top of tube device 40 may also be opened to allow ventilation during warmer periods by simply removing tie 47. Alternatively, non-communicating compartments, separately filled could also be used.

A second variation of the embodiment shown in FIG. 6 is found in FIG. 7. The protective device 50 is a double walled tube having an outer wall 51 and an inner wall 52 which walls are joined together at vertical line 53 to form vertical tabular communicating compartments 54. Lines 53 are discontinuous having gaps 53a interconnecting adjacent compartments 54 so that there can be fluid flow from one vertical compartment to another. The walls 51 and 52 are closed at the bottom but open at the top 55 so as to be inflatable by water or water and air added to compartments 54 at the top 55. Water is added to compartment 54 until the desired water depth has been reached as indicated by line 56. Protective device 50 as illustrated is only partially closed at the top by tie 57 such that when the device is placed over a plant 58 the space 59 surrounding the plant is enclosed by a double walled protective device with the exception of a variable space directly overhead. If desired compartments 54 can be non-communicating and separately filled.

A third variation is shown in FIG. 8. The protective device 60 comprises a double walled tube having an outside wall 61 and an inside wall 62. Spiral compartments 64 are formed by sealing walls 61 and 62 along lines 63 containing gaps 63a to allow fluid movement between compartments. Spiral compartments 64 may also be separate or non-communicating. Walls 61 and 62 are closed at the bottom but are open at the top 65 such that water may be added to the compartments to any desired depth level 66. Tube 60 may be placed over a plant 68 to form an enclosed space 69. The top of tube 60 may be opened as shown and is closable by pulling drawstring 67 which is threaded through loops 70 formed around the outside of tube 60 near the top.

A variant of FIG. 8 may be made by utilizing a single spiralling section of the place of a series of spiralling sections as illustrated. A single spiral would be in the form of a coil.

Many variants may be introduced to the thermal protective covers without departing from the scope of this invention. Obviously drawstrings or other closure means may be provided on any of the covers. Instead of tieing off the covers, an inverted paper or plastic bag could be inserted over the open tops thereof. The particular geometric shape of the compartments, e.g. annular rings, vertical tubes or spiralling sections, may be altered or combined as long as the compartments are capable of being filled with fluid and the thermal protective cover is, in itself, relatively self supporting. One can envision a series of rectangular, oval, triangular or patchwork quilt shaped compartments. Also the double walls may be sectionalized or compartmentalized only a portion of the way from the bottom to the top. While not as efficient, it is also possible to construct a thermal protective cover substantially as described from a plurality of separately formed, non-fluid communicating sections. These sections could be formed as annular rings, elongated tubes or other configurations that could be fitted together to form a plant enclosure. Annular rings of the same or diminishing diameter could be stacked as concentric rings about a growing area. A palisade of tubes could be arranged side by side to enclose a growing area. The use of separate sections is not to be considered the equivalent of a unitary structure of separate or communicating compartments but rather as a less efficient modification thereof.

While the invention has been described in the best mode known, the invention is not to be limited to those embodiments shown but is to be governed by the scope of the appended claims and equivalents thereof.

We claim:

1. A double walled tubular device for thermally protecting plants comprising an inner tubular wall having a top and bottom end, an outer tubular wall of substantially the same height having a top and bottom end, said inner and outer tubular walls being continuous with each other at the bottom ends and unjoined at the top ends thereof creating an annular space between said walls which is open at the top, said inner and outer tubular walls being joined together to divide said annular space into compartments which may be filled from the top with water or water and air.

2. A device for thermally protecting plants according to claim 1 wherein the inner and outer walls are intermittently joined together to form communicating compartments.

3. A device for thermally protecting plants according to claim 2 wherein the inner and outer walls are joined together along parallel lines.

4. A device for thermally protecting plants according to claim 3 wherein the communicating compartments are horizontal annular rings.

5. A device for thermally protecting plants according to claim 3 wherein the communicating compartments are vertical tubes.

6. A device for thermally protecting plants according to claim 3 wherein the communicating compartments are spiral sections.

7. A device according to claim 1 wherein the outer tubular wall contains closure means around the outside of the top portion thereof to reduce the diameter of both inner and outer tubular walls.

8. A device according to claim 7 wherein the closure means is a tie string.

9. A device for thermally protecting plants according to claim 1 wherein the inner and outer walls are joined together along solid lines to form separate compartments.

10. A device for thermally protecting plants according to claim 9 wherein the separate compartments are vertical tubes.

11. A device for thermally protecting plants according to claim 9 wherein the separate compartments are spiral sections.

12. A method of thermally protecting plants which comprises surrounding a plant by a double-walled tubular device comprising an inner tubular wall having a top and bottom end, an outer tubular wall of substantially the same height having a top and bottom end, said inner and outer tubular walls being continuous with each other at the bottom ends and unjoined at the top ends thereof creating an annular space between said walls which is open at the top, said inner and outer tubular walls being joined together to divide said annular space into compartments which are filled with water or water and air.

13. A method of thermally protecting plants according to claim 12 wherein the inner and outer walls are joined together along parallel lines.

14. A method of thermally protecting plants according to claim 13 wherein the compartments are vertical sections.

15. A method of thermally protecting plants according to claim 13 wherein the compartments are spiral sections.

16. A method of thermally protecting plants according to claim 12 wherein the outer tubular wall contains closure means around the outside of the top portion thereof to reduce the diameter of both inner and outer tubular walls.

17. A method of thermally protecting plants according to claim 16 wherein the closure means is a tie string.

* * * * *